(12) United States Patent
Cherubini et al.

(10) Patent No.: US 10,671,303 B2
(45) Date of Patent: Jun. 2, 2020

(54) CONTROLLING A STORAGE SYSTEM

(71) Applicant: INTERNATIONAL BUSINESS MACHINES CORPORATION, Armonk, NY (US)

(72) Inventors: Giovanni Cherubini, Rueschlikon (CH); Mark A. Lantz, Thalwil (CH); Vinodh Venkatesan, Waedenswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/702,807

(22) Filed: Sep. 13, 2017

(65) Prior Publication Data

US 2019/0079689 A1    Mar. 14, 2019

(51) Int. Cl.
*G06F 3/06* (2006.01)

(52) U.S. Cl.
CPC .......... *G06F 3/0634* (2013.01); *G06F 3/0604* (2013.01); *G06F 3/0611* (2013.01); *G06F 3/0625* (2013.01); *G06F 3/0689* (2013.01)

(58) Field of Classification Search
CPC .... G06F 3/0634; G06F 3/0604; G06F 3/0611; G06F 3/0689
See application file for complete search history.

(56) References Cited

U.S. PATENT DOCUMENTS

| | | |
|---|---|---|
| 8,296,513 B1 | 10/2012 | Liu |
| 8,301,852 B2 | 10/2012 | Hutchison et al. |
| 8,930,385 B2 | 1/2015 | Poltorak |
| 9,086,812 B2 | 7/2015 | Yokota et al. |
| 9,152,599 B2 | 10/2015 | Blinick et al. |
| 9,495,641 B2 | 11/2016 | Schmidt |

(Continued)

FOREIGN PATENT DOCUMENTS

GB    2529669 A    3/2016

OTHER PUBLICATIONS

Ditzler et al "Scaling a neyman-pearson subset selection approach via heuristics for mining massive data" [online] Published to IEEE Xplore Jan. 15, 2015 [retrieved on Oct. 11, 2018]. (Year: 2015).*

(Continued)

*Primary Examiner* — David Yi
*Assistant Examiner* — Dustin B. Fulford
(74) *Attorney, Agent, or Firm* — L. Jeffrey Kelly (57) ABSTRACT

Predictively selecting subset of disks of a storage system to be spun-up, including providing metadata of data entities stored in the disks of the storage system, estimating the data entity access probabilities for a prediction time window based on the metadata, each data entity access probability being indicative for the probability of access to a certain data entity within the prediction time window, calculating disk access probabilities for a prediction time window based on the estimated probability of access of data entities, each disk access probability being indicative for the probability of access to a certain disk within the prediction time window, estimating the number of disks to be spun-up in a certain prediction time window, dynamically adapting the data entity threshold value and/or the disk access threshold value, selecting a subset of disks to be spun-up in the following prediction time window.

19 Claims, 6 Drawing Sheets

(56) References Cited

U.S. PATENT DOCUMENTS

| | | | |
|---|---|---|---|
| 9,542,446 | B1 | 1/2017 | Duffield et al. |
| 2008/0114948 | A1 | 5/2008 | Le et al. |
| 2008/0126702 | A1* | 5/2008 | Zimoto .................. G06F 3/0625 |
| | | | 711/114 |
| 2009/0083558 | A1* | 3/2009 | Sugiki ................... G06F 1/3203 |
| | | | 713/320 |
| 2010/0100677 | A1 | 4/2010 | McKean et al. |
| 2010/0138388 | A1 | 6/2010 | Wakeling et al. |
| 2015/0212943 | A1* | 7/2015 | Yang ................... G06F 12/0862 |
| | | | 711/137 |
| 2016/0062689 | A1 | 3/2016 | Cherubini et al. |
| 2017/0075612 | A1* | 3/2017 | Nukariya .............. G06F 3/0653 |

OTHER PUBLICATIONS

Hushchyn et al "Distributed data replication and access optimization for LHCb storage system: A position paper" [online] Published to IEEE Xplore Aug. 1, 2016 [retrieved on Oct. 11, 2018]. Retrieved from the Internet <URL: https://ieeexplore.ieee.org/document/7526967> (Year: 2016).*

Ditzler et al "Scaling a neyman-pearson subset selection approach via heuristics for mining massive data" [online] Published to IEEE Xplore Jan. 15, 2015 [retrieved on Oct. 11, 2018]. (Year: 2015).*

Thereska et al "Sierra: practical power-proportionality for data center storage" [ACM online] EuroSys '11 Proceedings of the sixth conference on Computer systems Apr. 10-13, 2011. [retrieved on Oct. 16, 2018]. <URL: https://dl.acm.org/citation.cfm?id=1966461> (Year: 2011).*

Mell et al., "The NIST Definition of Cloud Computing," U.S. Department of Commerce, National Institute of Standards and Technology, Sep. 2011, p. 1-7, Special Publication 800-145.

Balakrishnan et al., "Pelican: A Building Block for Exascale Cold Data Storage", Proceedings of the 11th USENIX Symposium on Operating Systems Design and Implementation, Oct. 6-8, 2014, Broomfield, CO, pp. 351-365.

Bisson et al., "A Distributed Spin-Down Algorithm for an Object-Based Storage Device with Write Redirection", Proceedings of the 7th Workshop on Distributed Data and Structures (WDAS '06), Jan. 2006, pp. 1-8.

Colarelli et al., "Massive Arrays of Idle Disks for Storage Archives", Proceedings of the 2002 ACM/IEEE conference on Supercomputing, Baltimore, Maryland, Nov. 16-22, 2002, IEEE Computer Society Press Los Alamitos, CA, USA, pp. 1-11.

Ganesh et al., "Optimizing Power Consumption in Large Scale Storage Systems", Proceedings of the 11th USENIX workshop on Hot topics in operating systems, Article No. 9, San Diego, CA, May 7-9, 2007, USENIX Association Berkeley, CA, USA, copyright 2007, pp. 1-10.

Manzanares et al., "Energy Efficient Prefetching with Buffer Disks for Cluster File Systems", 2010 39th International Conference on Parallel Processing, Sep. 13-16, 2010, San Diego, CA, USA, pp. 404-413.

Mellor, "MAID to order: Inside Facebook's cold-storage data ziggurats", The Register, http://www.theregister.co.uk/2015/05/07/facebook_maid_gets_cold/, May 7, 2015, pp. 1-5.

Pinheiro et al., "Energy Conservation Techniques for Disk Array-Based Servers", ACM International Conference on Supercomputing 25th Anniversary Volume, ICS'04, Jun. 26-Jul. 1, 2004, Saint-Malo, France, pp. 369-379.

Schulz et al., "MAID 2.0: Energy Savings without Performance Compromises Energy Savings for Secondary and Near-line Storage Systems", Industry Trends and Technology Perspective Solutions Brief, The StorageIO Group—Information Technology Analysts and Consultantancy, Jan. 2, 2008, pp. 1-8.

Son et al., "Energy-Aware Data Prefetching for Multi-Speed Disks", CF'06, May 3-5, 2006, Ischia, Italy, pp. 105-114.

Weingand et al., "The Future of Tape!", Tape Storage Solutions, IBM Systems, pp. 1-42, Accessed Sep. 8, 2017.

Pending U.S. Appl. No. 15/467,423, filed Mar. 23, 2017, titled "Managing Digital Datasets on an Multi-Tiered Storage System Based on Predictive Caching", pp. 1-35.

Pending U.S. Appl. No. 14/749,912, filed Jun. 25, 2015, titled "Data Prefetching for Large Data Systems", pp. 1-28.

Sun et al., "Relevance search and anomaly detection in bipartite graphs", ACM SIGKDD Explorations Newsletter, vol. 7, Issue 2, Dec. 2005, pp. 48-55, ACM New York, NY, USA.

He et al., "BiRank: Towards Ranking on Bipartite Graphs", IEEE Transactions on Knowledge and Data Engineering, vol. 29, Issue: 1, Jan. 1, 2017, pp. 57-51.

Yin et al., "Ranking Relevance in Yahoo Search", KDD '16, Aug. 13-17, 2016, San Francisco, CA, USA, pp. 1-10.

Cherubini et al., "Cognitive Storage for Big Data", IEEE Journals & Magazines, Computer, vol. 49, Issue: 4, Apr. 2016, pp. 43-51.

IBM, "IBM Content Classification", https://www.ibm.com/us-en/marketplace/content-classification, printed Sep. 12, 2017, pp. 1-4.

Khurana et al., "Graph-based exploration of non-graph datasets", Proceedings of the VLDB Endowment, vol. 9, Issue 13, Sep. 2016, pp. 1557-1560.

Deng et al., "The Data Civilizer System", 8th Biennial Conference on Innovative Data Systems Research (CIDR '17) Jan. 8-11, 2017, Chaminade California, USA, pp. 1-7.

University of Leicester, "What can Google tell us about 'the memory web' in the brain? Internet searches used to show how long-term memories are coded in the brain." ScienceDaily, Nov. 15, 2016, www.sciencedaily.com/releases/2016/11/161115121524.htm, pp. 1-3.

Wikipedia, "Adaptive replacement cache", https://en.wikipedia.org/wiki/Adaptive_replacement_cache, printed Sep. 12, 2017, pp. 1-3.

Seshadri et al., "Software defined just-in-time caching in an enterprise storage system", IBM Journal of Research and Development, vol. 58, Issue: 2/3, Mar.-May 2014, pp. 7:1-7:13.

Kim et al., "Flash-Conscious Cache Population for Enterprise Database Workloads", ADMS' 14, a workshop co-located with The 40th International Conference on Very Large Data Bases, Sep. 1-5, 2014, Hangzhou, China, pp. 1-12.

Dufrasne et al., "IBM DS8000 Easy Tier", IBM Redbooks, Storage, Aug. 2016, pp. 1-166.

Megiddo et al., "Outperforming LRU with an adaptive replacement cache algorithm." Computer 37.4, Apr. 2004, pp. 4-11.

Branch et al., "A Subspace, Interior, and Conjugate Gradient Method for Large-Scale Bound-Constrained Minimization Problems", SIAM Journal on Scientific Computing, vol. 21, Issue 1, Aug.-Sep. 1999, pp. 1-23.

Liu et al., "On the limited memory BFGS method for large scale optimization", Journal on Mathematical Programming: Series A and B archive, vol. 45, Issue 3, Dec. 1989, pp. 503-528, Springer-Verlag New York, Inc. Secaucus, NJ, USA.

Zhu et al., "Algorithm 778: L-BFGS-B: Fortran subroutines for large-scale bound-constrained optimization", Journal on ACM Transactions on Mathematical Software (TOMS), vol. 23, Issue 4, Dec. 1997, pp. 550-560, ACM New York, NY, USA.

Pending U.S. Appl. No. 15/660,434, filed Jul. 26, 2017, titled "Dataset Relevance Estimation in Storage Systems", pp. 1-52.

* cited by examiner

CONTROLLING A STORAGE SYSTEM

BACKGROUND

The present invention relates to a method for controlling a storage system. More specifically, the present document relates to a method for predictively selecting a subset of disks of a storage system to be spun-up in order to enhance energy efficiency, respectively, access latency.

SUMMARY

According to an embodiment, a method, computer system, and computer program product for predictively selecting a subset of disks of a storage system to be spun-up is provided. The present invention may include providing metadata of data entities stored in the disks of the storage system, estimating the data entity access probabilities for a prediction time window based on said metadata, each data entity access probability being indicative for the probability of access to a certain data entity within said prediction time window, calculating disk access probabilities for a prediction time window based on the estimated probability of access of data entities, each disk access probability being indicative for the probability of access to a certain disk within said prediction time window, estimating the number of disks to be spun-up in a certain prediction time window based on a comparison of data entity access probabilities with a given data entity access threshold value and based on information regarding a false-negative rate of data entity access in a previous prediction time window, and/or a comparison of disk access probabilities with a given disk access threshold value and based on information regarding a false-negative rate of disk access in a previous prediction time window, dynamically adapting the data entity threshold value and/or the disk access threshold value in order to change the number of disks to be spun-up in the following prediction time window, selecting a subset of disks to be spun-up in the following prediction time window based on said adapted disk access threshold value and/or the adapted data entity access threshold value.

According to an embodiment, a method, computer system, and computer program product for predictively selecting a subset of disks of a storage system to be spun-up is provided. The present invention may include a computer readable storage medium having program instructions embodied, the program instructions being executable by a processor to cause the processor to execute the method for predictively selecting a subset of disks as indicated above.

According to an embodiment, a storage system including a plurality of disks for storing data and a control entity for predictively selecting a subset of disks to be spun-up is provided. The storage system includes a metadata database comprising metadata of data entities stored in the disks of the storage system, an access prediction unit adapted to estimate the data entity access probabilities for a prediction time window based on said metadata, each data entity access probability being indicative for the probability of access to a certain data entity within said prediction time window, an access prediction unit adapted to calculate disk access probabilities for a prediction time window based on the estimated probability of access of data entities, each disk access probability being indicative for the probability of access to a certain disk within said prediction time window. The storage system is further adapted to estimate the number of disks to be spun-up in a certain prediction time window based on a comparison of data entity access probabilities with a given data entity access threshold value and based on information regarding a false-negative rate of data entity access in a previous prediction time window, and/or a comparison of disk access probabilities with a given disk access threshold value and based on information regarding a false-negative rate of disk access in a previous prediction time window, dynamically adapt the data entity threshold value and/or the disk access threshold value in order to change the number of disks to be spun-up in the following prediction time window and select a subset of disks to be spun-up in the following prediction time window based on said adapted disk access threshold value and/or the adapted data entity access threshold value.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate to the field of computing, and more particularly to the present document relates to a method for predictively selecting a subset of disks of a storage system to be spun-up in order to enhance energy efficiency, respectively, access latency.

The following described exemplary embodiments provide a system, method, and program product to, among other things predictively selecting a subset of disks of a storage system to be spun-up in order to enhance energy efficiency, respectively, access latency.

Therefore, the present embodiment has the capacity to improve the technical field of controlling a storage system by spinning up a disk before a request for a certain data entity (e.g. a file) stored at the disk arrives. By spinning up disks before the requests arrive, the system may yield superior performance in terms of access time compared to the state-of-the-art massive array of idling disks (hereinafter "MAID") storage systems technologies, while still retaining the energy efficiency.

The present invention may also include the following example features:

According to an embodiment of the proposed method, the number of disks to be spun-up in a certain prediction time window is estimated by additionally considering a false-positive rate of disk access in a previous prediction time window. Thereby the prediction accuracy could be further increased.

According to an embodiment of the proposed method, the number of disks to be spun-up in a certain prediction time window is estimated by additionally considering a false-positive rate of data entity access in a previous prediction time window. Advantageously, the prediction accuracy could be further increased.

According to an embodiment of the proposed method, the step of estimating the data entity access probabilities is performed using a machine-learning algorithm based on metadata associated with a certain data entity. Using said machine-learning algorithm, the prediction accuracy could be further increased.

According to an embodiment of the proposed method, the data entity access threshold value and/or the disk access threshold value builds an extended Neyman-Pearson threshold value. According to the Neyman-Pearson lemma, the likelihood-ratio test is the most powerful test with probability of false-positive less than or equal to a given target, when the threshold value for the test is chosen according to the target false-positive probability. Therefore, by dynamically adapting the Neyman-Pearson thresholds for data entity access and disk access, prediction accuracy can be further increased. The value of the extended Neyman-Pearson threshold may be chosen according to a criterion, which defines a target power consumption, a target energy consumption, a target mean access latency of a file to be accessed and/or a hardware constraint to be met.

According to an embodiment of the proposed method, the method further comprises the step of defining a criterion, wherein the data entity threshold value and/or the disk access threshold value is dynamically adapted in order to meet said criterion. Thus, dynamically adapting said threshold values could be used for fulfilling certain requirements. For example, by defining a target energy consumption of the storage system, the method can be configured to optimize the access latency of the storage system. Alternatively, it may be possible to define a target access latency in order to optimize/reduce the energy consumption of the storage system without exceeding the target access latency.

According to an embodiment of the proposed method, said criterion defines a target power consumption, a target energy consumption, a target mean access latency of a file to be accessed and/or a hardware constraint to be met. Advantageously, said threshold values could be chosen to achieve a certain power/energy consumption level or a certain level of access latency.

According to an embodiment of the proposed method, the storage system may include at least one additional storage medium, said additional storage medium including a lower access latency compared to said disks, wherein data entities with a data entity access probability above a certain threshold value are prefetched into said additional storage medium. Thereby, specifically in case of long-lasting prediction time windows, the access latency and the energy efficiency could be improved because the disks which are predicted to be accessed do not have to be spun during the whole prediction time window.

According to an embodiment of the proposed method, disks to be spun-down are determined based on metadata of data entities included in the respective disk, specifically based on disk access probability and/or data entity access probabilities of data entities included in the respective disk. Thereby not only disks to be advantageously spun-up but also disks to be advantageously spun-down can be determined which may lead to a further increased energy efficiency.

According to an embodiment of the proposed method, a priority scheme is used for determining disks to be spun-down. Thereby priority levels could be assigned to the respective disks in order to determine those disks which should be preferably spun down.

According to an embodiment of the proposed method, said priority scheme defines multiple priority levels to be associated with a certain disk, wherein the selection of priority level for a certain disk depends on information regarding the access history of the respective disk. Thereby, least recently used disks may be prioritized compared to disks which have not been used for a longer time period.

According to an embodiment of the proposed method, the data entity threshold value and/or the disk access threshold value is iteratively adapted in successive prediction time windows. Thereby, said threshold value(s) could be appropriately chosen according to the current storage system usage and other given requirements.

According to an embodiment of the proposed method, an expected maximum power consumption of the storage system is calculated based on information regarding false-positive and/or false-negative rates of disk access of a previous prediction time window. Said expected maximum power consumption could be chosen as a control value in order to meet a certain power consumption boundary and jointly reducing the data entity access latency.

According to an embodiment of the proposed method, the expected maximum power consumption is compared with a pre-defined power consumption value and the data entity threshold value and/or the disk access threshold value is adapted based on the comparison result. A power consumption boundary defined by said pre-defined power consumption value could be met.

According to an embodiment of the proposed method, an expected energy consumption of the storage system is calculated based on information regarding false-positive and/or false-negative rates of disk access of a previous prediction time window. An expected energy consumption value could be chosen as a control value in order to meet a certain energy consumption boundary and jointly reducing the data entity access latency.

According to an embodiment of the proposed method, the expected energy consumption is calculated based on information regarding a peak power consumption value during a spin-up phase of the disks and a power consumption value of a spinning disk after expiry of the spin-up phase. A time-variant power consumption profile over the prediction time window could be taken into account when calculating the expected energy consumption of the storage system.

According to an embodiment of the proposed method, the expected energy consumption is compared with a pre-defined energy consumption value and the data entity threshold value and/or the disk access threshold value is adapted based on a comparison result. An energy consumption boundary defined by said pre-defined energy consumption value could be met.

According to an embodiment of the proposed method, the data entity threshold value and/or the disk access threshold value is increased if the expected energy consumption is greater than the pre-defined energy consumption value and the data entity threshold value and/or the disk access threshold value is decreased if the expected energy consumption is smaller than the pre-defined energy consumption value. Thereby, the number of disks to be proactively spun-up could be adapted in order to meet the pre-defined energy consumption boundary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In a broad sense, the present disclosure relates to the problem of high access latency in Massive array of idling disks (hereinafter "MAID") storage systems. A predictive approach for spinning up idling disks may be chosen which spins up the disk before a request for a certain data entity (e.g. a file) stored at the disk arrives. Machine learning may be applied on data entity/file metadata to provide an estimate of the probability of access for each data entity/file over a time window. This also allows the estimation of the probability of access for each disk in the system. A disk is proactively spun-up for the duration of the time window if its probability of access exceeds a dynamically adjusted threshold. The threshold may be determined to jointly optimize the mean access latency and the average power consumption. By spinning up disks before the requests arrive, the system may yield superior performance in terms of access time compared to the state-of-the-art MAID technologies, while still retaining the energy efficiency advantage of MAID systems.

In large data storage systems, for example data storage systems storing information of a social networking service, typically a large amount of data remains unaccessed at any point of time. Keeping all disks spinning all the time may unnecessarily waste a large amount of energy. In such environments, MAID systems may be used which spin down disks when there is no access to data stored at the respective disk and spin the disk up when a data access is made. However, said spinning up of disks may take up to 10 seconds, significantly increasing the access latency while improving the energy efficiency of the storage system.

In order to address the problem of increased access latency, the present disclosure suggests using an access prediction approach with an adaptive thresholding. A machine learning technique may be used for predicting a probability of access to a certain file. In the following, the wording "file" should be read as being synonymous with the more general expression "data entity". Said machine learning approach may use a self-learning algorithm, for example, a state space model which is adapted to predict the probability of a future access to a certain file in a certain prediction time window. For predicting the future file accesses, the algorithm may use metadata stored in a metadata database. The metadata may include, for example, information regarding the access history, file type information, file size information, the source of data etc. There may also be metadata specific to certain types of files, e.g., focal length, aperture, camera model, etc., for photos, artist, album, genre, etc., for music, primary investigators, direction of observation, stars/galaxies, etc. for astronomical observation data. The algorithm may be trained in advance and tested in order to ensure a required prediction quality.

Figure 1:
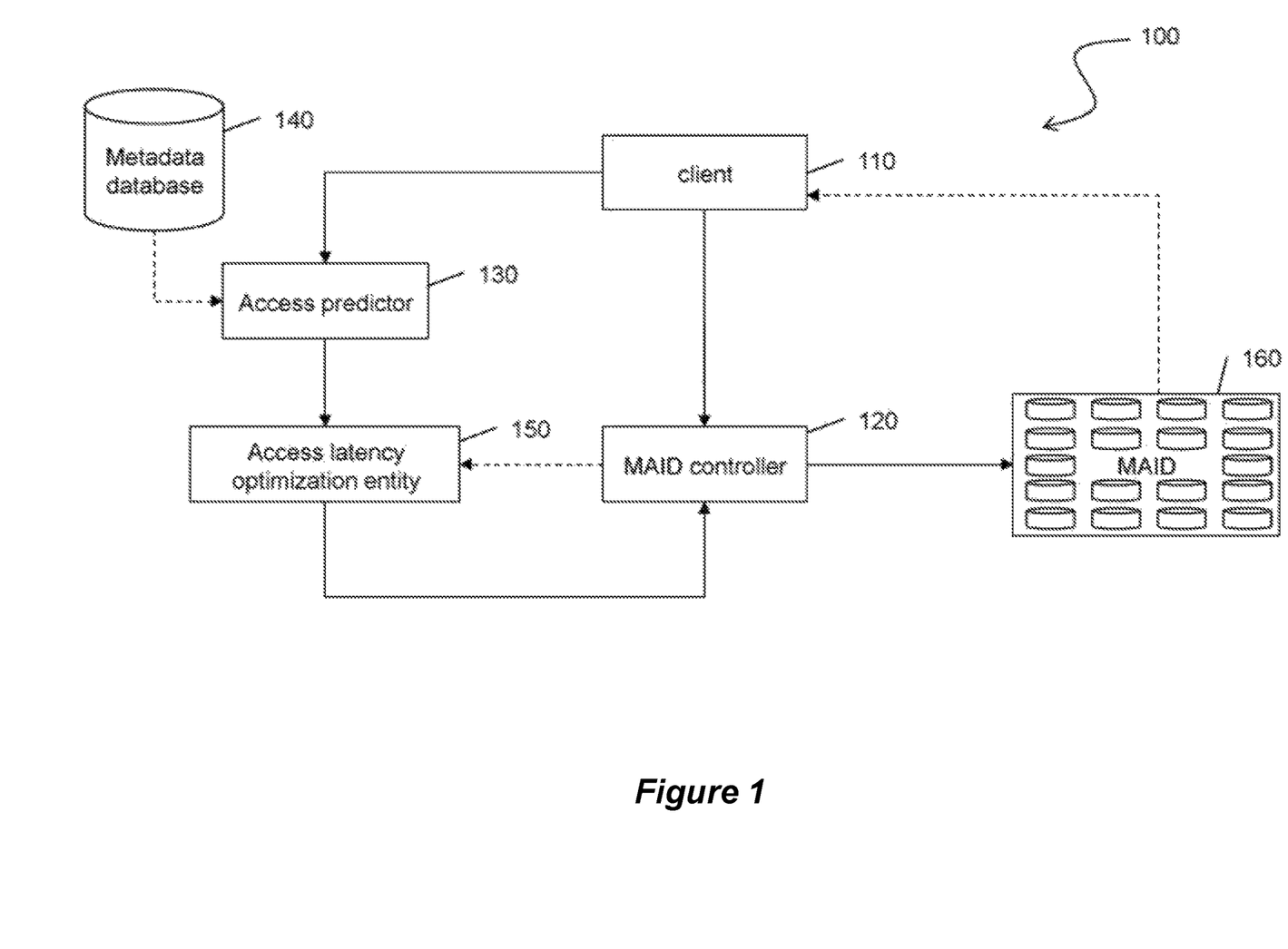
FIG. 1 is a basic and schematic illustration of a system for improving access latency according to an embodiment.

Referring to FIG. 1, a computerized system 100 for improving access latency of MAID storage systems is shown, according to an embodiment. In said figure, logic flow is indicated by solid lines and information flow is indicated by dashed lines. A client 110 may provide a request for a certain file to a MAID controller 120. In addition, said request may be provided to an access predictor 130, in the following also referred to as access prediction unit. Said access predictor 130 may be coupled with a metadata database 140 which stores upper-mentioned metadata. Based on said metadata, the access predictor 130 may be adapted to predict the probability of a future access to a certain file in a certain prediction time window. Said prediction results may be provided to an access latency optimization entity 150. Said access latency optimization entity 150 is adapted to select disks to be proactively and in advance spun up before a request for a certain file arrives at the respective disk. The access latency optimization entity 150 is coupled with the MAID controller 120 in order to instruct the MAID controller 120 which disks of the MAID 160 should be spun up in advance.

In the following, a list of abbreviations is provided which are used in the following for explaining the disclosed algorithms in detail:

f: file;
d: disk;
F(d): set of files in disk d;
$N_D$: number of disks in the system;
$N_{SU}$: number of spun-up disks;
$K_{P,avg}$: average power consumption of a disk when spinning;
$K_{P,peak}$: peak power consumption of a disk when it is spun up from an idle state;
$\tau_{SU}$: access latency of a disk when spun up;
$\tau_{SD}$: access latency of a disk when spun down (or idling);
$T_{pred}$: time period over which access predictions are made, also referred to as prediction time window;
$T_{startup}$: time required to spin up an idle disk (during which a disk consumes peak power, $K_{P,peak}$);
P(f): estimated probability of access for file f during next time period of prediction $T_{pred}$;
P(d): estimated probability of access for disk d during next time period of prediction $T_{pred}$;
$P_{FP,file}$, $P_{TP,file}$: observed rates of false and true positives for files during the previous time period of prediction $T_{pred}$;
$P_{FN,file}$, $P_{TN,file}$: observed rates of false and true negatives for files during the previous time period of prediction $T_{pred}$;
$P_{FP,disk}$, $P_{TP,disk}$: observed rates of false and true positives for disks during the previous time period of prediction $T_{pred}$;
$P_{FN,disk}$, $P_{TN,disk}$: observed rates of false and true negatives for disks during the previous time period of prediction $T_{pred}$;

It is worth mentioning that $P_{TN,file}+P_{FN,file}=1$, $P_{TN,disk}+P_{FN,disk}=1$; $P_{TP,file}+P_{FP,file}=1$ and $P_{TP,disk}+P_{FP,disk}=1$. Therefore, in the following, only the false-positive and false-negative rates are used.

In the following, the relationships for access prediction with adaptive thresholding are explained in greater detail. A file f in disk d is predicted to be accessed within the next time period $T_{pred}$ if the estimated probability of said file to be accessed is equal to or above a threshold $\gamma(d)$, i.e. $P(f) \geq \gamma(d)$, wherein $0 \leq \gamma(d) \leq 1$. In the following, $\gamma(d)$ is also referred to as data entity access threshold value. Specifically, $\gamma(d)$ may be an extended Neyman-Pearson threshold for files in disk d. At the beginning of the adaptive process, the data entity access threshold value γ(d) may be initialized to a certain value, e.g. initialized to 0.5 and may be iteratively adapted (increased or decreased) in the following prediction time windows for each file f. The set of files, $F_P(d)$, predicted to be accessed from disk d in the next interval is given by: $F_P(d)=\{f: f \in F(d) \text{ and } P(f) \geq \gamma(d)\}$. In other words, a file is predicted to be accessed if it is stored in the respective disk and the estimated probability P(f) of access for file f during next time period of prediction $T_{pred}$ is equal or greater than the data entity access threshold value γ(d). It is worth mentioning that the number of files in this set, $|F_P(d)|$, may monotonically decrease with increasing values of γ(d).

Based on the estimated probabilities P(f) of access for files f during next time period of prediction $T_{pred}$, the probability of a disk being accessed can be derived. More in detail, the probability of a disk being accessed is:

$$P(d)=1-P(\text{no file in disk } d \text{ is accessed})=1-\Pi_{f\in F(d)}(1-P(f));$$

Said formula is based on the assumption that files on each disk are accessed independently. A disk d is spun up for a time period $T_{pred}$ if the estimated probability of said disk to be accessed P(d) is equal to or above a threshold θ(d), i.e. P(d)≥θ(d), wherein 0≤θ(d)≤1. In the following, θ(d) is also referred to as disk access threshold value. Specifically, θ(d) may be an extended Neyman-Pearson threshold for disk d. At the beginning of the adaptive process, the disk access threshold value θ(d) may be initialized to a certain value, e.g. initialized to 0.5 and may be iteratively adapted (increased or decreased) in the following prediction time windows for each disk d.

The set of disks $D_{SU}$ to be spun-up preemptively can be determined by comparing the disk access probability P(d) with the disk access threshold value θ(d). More in detail, a disk is selected to be spun-up if said disk access probability P(d) is equal or greater than θ(d), i.e. P(d)≥θ(d). Thus, the set of disks $D_{SU}$ to be spun up preemptively includes all disks d, for which said disk access probability P(d) is equal or greater than θ(d), i.e. $D_{SU}=\{d: P(d) \geq \theta(d)\}$. It is worth mentioning that the number of disks $|D_{SU}|$ that are spun up monotonically decreases with increasing values of θ(d). Thus, the number of spun-up disks $|D_{SU}|$ can be varied by varying the value of the disk access threshold value θ(d). The disks that are not spun up are assumed to be spun down in the next prediction time window. The set of spun-down disks is denoted as $D_{SD}$.

Due to prediction inaccuracies, false positive or false negative prediction results may occur. In the present disclosure, the expression "false positive" refers to a prediction that a file/disk is accessed in the next prediction time window but is actually not accessed. So, in other words, due to a wrong prediction result, the disk may be unnecessarily spun-up which results in a waste of energy and has negative impact on disk reliability, i.e. causes higher disk failure rates. On the other hand, the expression "false negative" refers to a prediction that a file/disk is not accessed in the next prediction time window and therefore not spun-up in advance but actually is accessed in said next prediction time window. In other words, due to a wrong prediction result, the disk may kept in idle state and has to be spun up in case that a file stored in said idle disk is accessed which results in increased access latency.

False negative predictions of file access may result in false negative predictions of disk access. Accordingly, one or more disks which were not included in the set of disks $D_{SU}$ (determined, as mentioned before based on correct prediction results) may be also accessed in the next prediction time window $T_{pred}$. Thus, the expected number of disks accessed $E[N_{SU}]$ (i.e. that will be spun up in the next prediction time window $T_{pred}$) can be determined as follows:

$$E[N_{SU}]=|D_{SU}|+|D_{SD}| \cdot P_{FN,disk};$$

Thereby, $P_{FN,disk}$ refers to the false-negative disk probability, i.e. the probability that a disk is wrongly predicted to be not spun up but actually has to be spun-up in the next prediction time window.

Similarly, the expected number of files that will be accessed from disk d in the next prediction time window $T_{pred}$ can be determined as follows:

$$E[N_F(d)]=|F_P(d)| \cdot (1-P_{FP,file})+(|F(d)|-|F_P(d)|) \cdot P_{FN,file};$$

Hereby, the first summand refers to the number of files predicted as being accessed multiplied by the true-positive probability (reflected by $(1-P_{FP,file})$) of file access (which leads to a revised number of accessed files by taking into account the false-positive rate and subtracting the number of files which are predicted as being accessed but actually not accessed). The second summand refers to the number of files which are predicted as not being accessed in the next prediction time window, but actually, due to false-negative prediction results, have to be accessed.

The mean access latency could be calculated as a weighted mean of $\tau_{SU}$ and $\tau_{SD}$ with the expected number of files that will be accessed on spun-up and spun-down disks, respectively, in the next prediction time window:

$$E[L]=\tau_{SU} \cdot \Sigma_{d \in D_{SU}} E[N_F(d)]+\tau_{SD} \cdot \Sigma_{d \in D_{SD}} E[N_F(d)];$$

Said formula can be simplified if it is assumed that all disks store the same number of files ($|F(d)|=n$) and the data entity access threshold value γ(d) is equal for all disks (i.e. γ(d)=γ) resulting in the assumption that the number of files predicted to be accessed in the next prediction time window is constant ($|FP(d)|=m$) for all disks.

Figure 2:
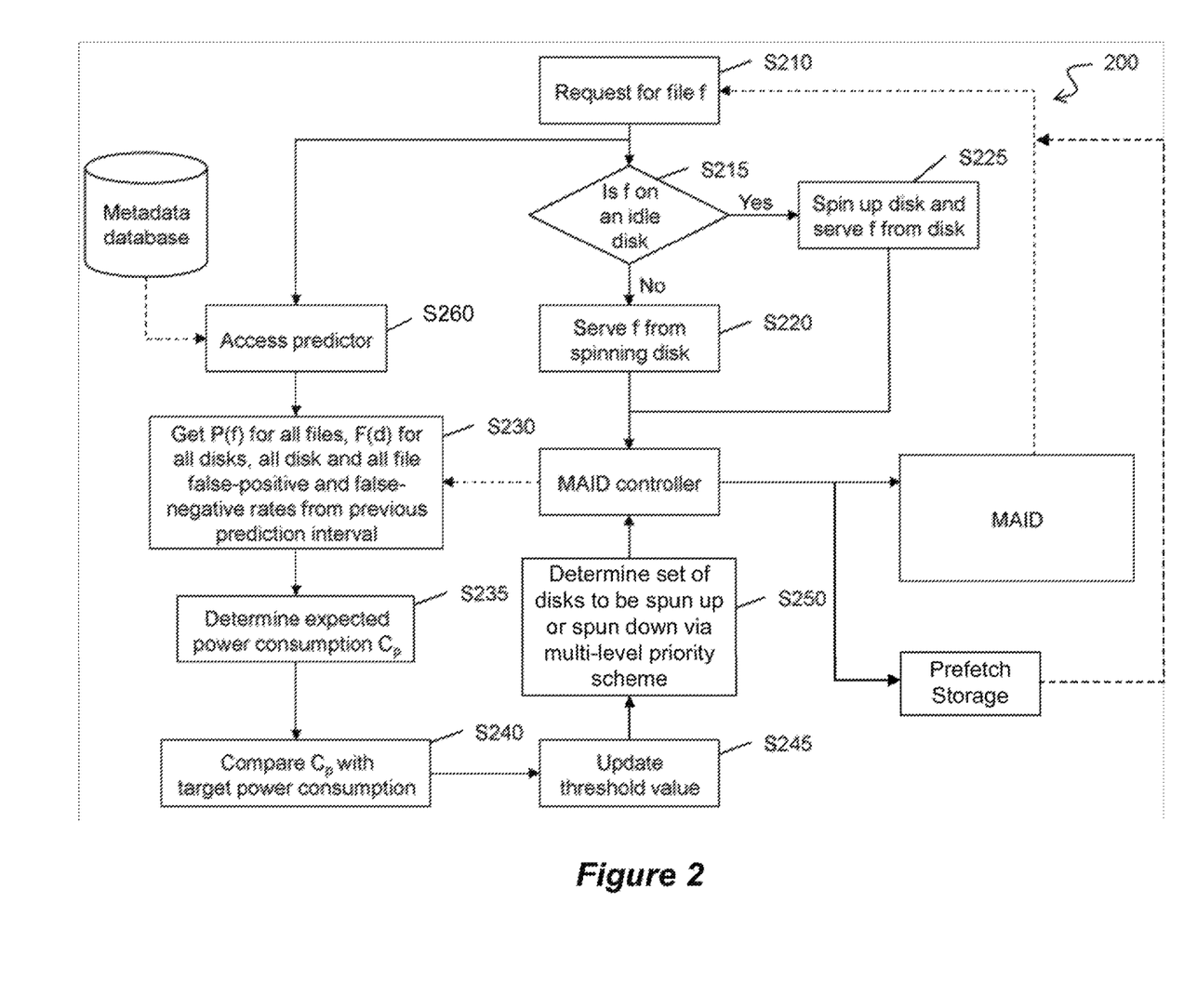
FIG. 2 is a basic system flow chart illustrating a first embodiment of an access latency optimization routine, according to an embodiment.

Referring to FIG. 2, a schematic illustration of an access latency optimization routine 200 in which an electric power constraint is used for dynamically adapting the disk access threshold value θ(d) is shown, according to an embodiment. In other words, a target power consumption of the MAID is defined and spinning up of disks included in the MAID is controlled such that the power consumption of the MAID meets the defined target power consumption.

In case of an arrival of a file request (S210) (e.g. initiated by a client computer) it is checked whether the file f is stored on a spinning disk or stored on an idle disk (S215). If f is on a spinning disk, file f is provided from said spinning disk (S220). Said spinning disk may have been selected to be spun-up proactively. In case that f is on an idle disk, said idle disk has to be activated and spun-up (S225). This situation may occur in case of upper-mentioned false-negative prediction scenarios of files, i.e. the prediction indicates that a certain file is not accessed in the prediction time window but the file is actually accessed within said prediction time window.

Information regarding the request for file f may also be provided to the access predictor (S260). As previously stated, the access predictor may be coupled with a metadata database and may receive metadata from said database. Said access predictor may be configured to calculate file access probabilities in order to estimate the probability that a certain disk is accessed or not.

An access latency optimization entity may receive the file access probabilities for all files from the access predictor, the set of files F(d) included in the respective disks and information regarding false-positive and false-negative rates for all files and all disks of the previous prediction time window from the MAID controller (S230).

Based on said information, the expected power consumption $C_p$ for the subsequent prediction time window can be determined (S235). The expected power consumption $C_p$ can be calculated as follows:

$$C_P = K_{P,avg} \cdot E[N_{SU}];$$

wherein $K_{P,avg}$ is the average power consumption of a spinning disk and $E[N_{SU}]$ is the expected number of disks to be spun-up. As previously described, $E[N_{SU}]$ is determined based on false-positive and false-negative rates of disk and file accesses of the previous prediction time window.

The expected power consumption $C_p$ may be compared with a target power consumption (S240). Said target power consumption may be a predefined parameter which was chosen according to given requirements. Based on the comparison result, the data entity threshold value and/or the disk access threshold value may be varied (S245). Specifically, if the expected power consumption $C_p$ is below the target power consumption, it implies that more disks can be spun up in order to reduce the expected latency in the next prediction time period. Thus, the data entity threshold values and/or the disk access threshold values may be lowered resulting in a larger number of files and disks predicted to be accessed. Specifically, lowering the thresholds increases the file and disk false-positive rates while reducing the false-negative rates, resulting in a larger number of disks, $|D_{SU}|$, being spun up in the next prediction time window and a smaller number of disks, $|D_{SD}|$, remaining spun down. As a result, the expected mean access latency E[L] is decreased.

Alternatively, i.e. the expected power consumption $C_p$ is above the target power consumption, the data entity threshold values and/or the disk access threshold values may be increased, resulting in a smaller number of files and disks predicted to be accessed. In addition, hardware constraints, e.g., indicating the maximum number of disks that are allowed to be spun up at the same time, can also be used to adjust the disk access threshold values to ensure that only said maximum number of disks is spun up in the following prediction time window. Based on the dynamically varied data entity threshold values and/or the disk access threshold values, the set of disks to be spun up in the next prediction time window is determined (S250) and provided to the MAID controller.

Figure 3:
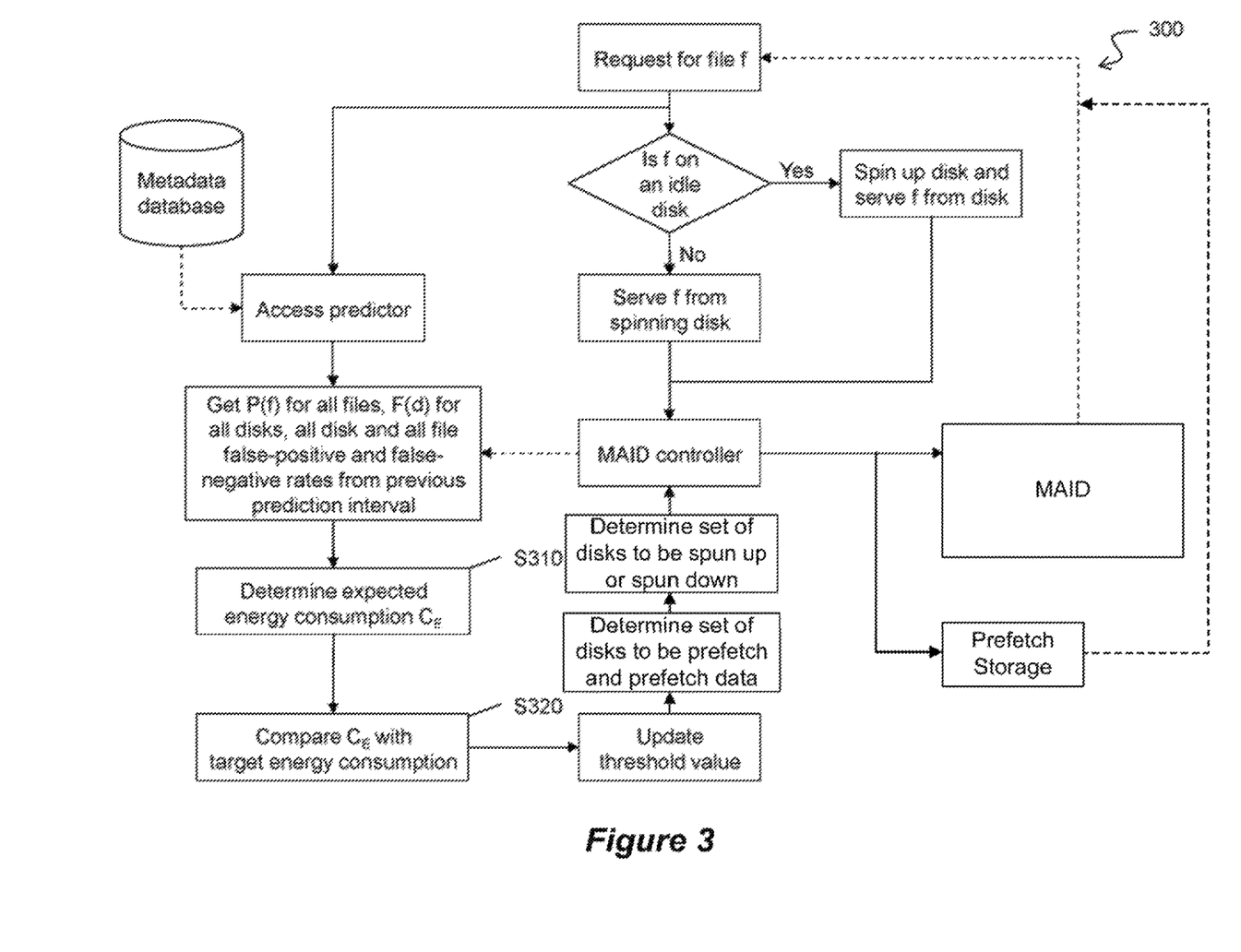
FIG. 3 is a basic system flow chart illustrating a second embodiment of an access latency optimization routine, according to an embodiment.

Referring to FIG. 3, an access latency optimization routine 300 which allows an energy-constrained access latency optimization is shown, according to an embodiment. In the following, only differences with respect to the embodiment described before in conjunction with FIG. 2 are explained. Apart from that and if not explicitly indicated otherwise, the description of the embodiment of FIG. 2 does also apply to the embodiment of FIG. 3. The main difference of the embodiment of FIG. 3 compared with the embodiment of FIG. 2 is that an expected energy consumption $C_E$ is determined (S310) and said expected energy consumption $C_E$ is compared with a target energy consumption in order to meet an energy consumption boundary (S320).

Said embodiment is based on the observation that the peak power consumption during a disk spin-up operation, $K_{P,peak}$, may be significantly higher than the average power consumption, $K_{P,avg}$. So, an energy-constrained access latency optimization may be preferable (compared to a power-constrained access latency optimization). The expected energy consumption $C_E$ may be determined as follows:

$$C_E = |D_{SU}| \cdot (T_{startup} \cdot K_{P,peak} + (T_{pred} - T_{startup}) \cdot K_{P,avg}) + \\ |D_{SD}| \cdot P_{FN,disk} \cdot (T_{startup} \cdot K_{P,peak} + ((T_{pred} - T_{startup})/2) \cdot K_{P,avg}));$$

The first summand refers to disks which are proactively spun up, wherein said disks consume peak power ($K_{P,peak}$) during a startup phase ($T_{startup}$) and average power ($K_{P,avg}$) during the remaining period ($T_{pred} - T_{startup}$) within the prediction time window. The second summand refers to disks which are not proactively spun up due to false-negative prediction results. In said second summand, the remaining period ($T_{pred} - T_{startup}$) is divided by two based on the assumption that, on an average, a false-negative request may arrive in the middle of the prediction time window $T_{pred}$.

Similar to the embodiment of FIG. 2, the expected energy consumption $C_E$ may be compared with a target energy consumption (S320). Said target energy consumption may be a predefined parameter which was chosen according to given requirements. Based on the comparison result, the data entity threshold value and/or the disk access threshold value may be varied. Specifically, if the expected energy consumption $C_E$ is below the target energy consumption, it implies that more disks can be spun up in order to reduce the expected latency in the next prediction time period. Thus, the data entity threshold values and/or the disk access threshold values may be lowered resulting in a larger number of files and disks predicted to be accessed. Specifically, lowering the thresholds increases the file and disk false-positive rates while reducing the false-negative rates, resulting in a larger number of disks, $|D_{SU}|$, being spun up in the next prediction time window and a smaller number of disks, $|D_{SD}|$, remaining spun down. As a result, the expected mean access latency E[L] is decreased.

Alternatively, i.e. the expected energy consumption $C_E$ is above the target energy consumption, the data entity threshold values and/or the disk access threshold values may be increased, resulting in a smaller number of files and disks predicted to be accessed.

The prediction time window length may be, for example, in the range from seconds to days. It has been observed that the prediction accuracy may be increased when choosing longer prediction time windows. However longer prediction time windows also require that the predicted disks are spinning for the entire duration of said prediction time window, which results in reduced energy efficiency. In order to avoid that the disks that are likely to be accessed in the next prediction time window are spinning during the entire duration of said prediction time window, in a preferred embodiment, the files predicted to be accessed may be preferably prefetched to a further storage medium. Said further storage medium may comprise a reduced access latency, e.g. may not be a rotating storage medium but may be a RAM-storage, FLASH-storage etc. So, by spinning up the respective disks comprising the files, transferring the files to said further storage medium and spinning them down again as soon as the prefetching of files is complete, the energy efficiency of the storage system can be improved, specifically in case of long prediction time windows. In addition, said prefetching may also offer a performance advantage in terms of access latency as the predicted files are served from a faster storage medium.

According to further embodiments, the access prediction unit can also be used for predicting which disks have to be spun down. Said prediction may also be made based on file-specific metadata. The access prediction unit may for example employ a priority scheme in order to spin down disks which are used with low access rate with a higher priority than disks associated with a higher access rate. In addition, least recently used disks may be spun down with lower priority than disks which have been not used for a longer time period.

Figure 4:
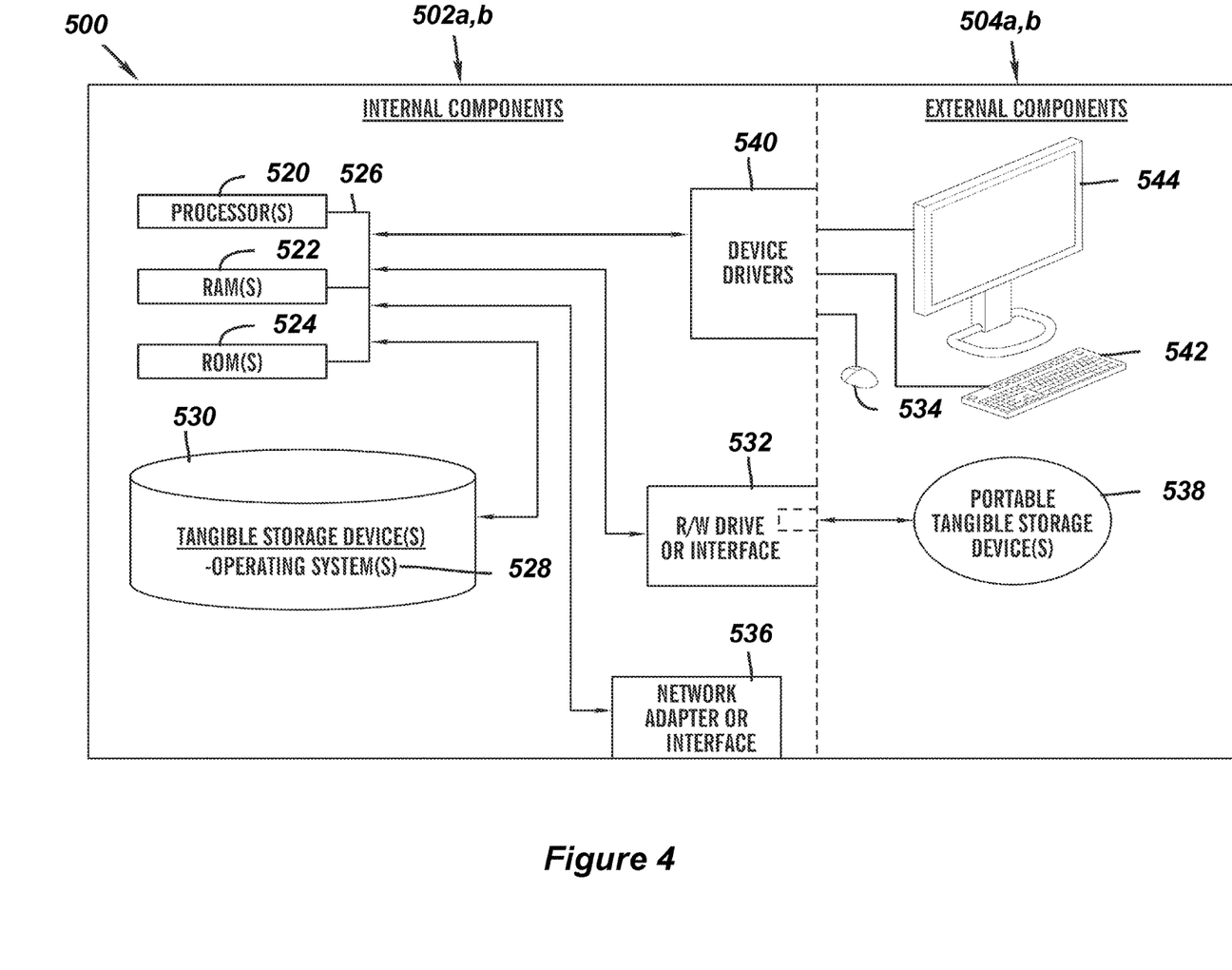
FIG. 4 is a block diagram of internal and external components of computers and servers, according to an embodiment.

Referring to FIG. 4, a block diagram 500 of internal and external components of a client computing device and a server is shown, in accordance with an embodiment. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 502, 504 is representative of any electronic device capable of executing machine-readable program instructions. The data processing system 502, 504 may be representative of a smart phone, a computer system, PDA, or other electronic devices. Examples of computing systems, environments, and/or configurations that may represented by the data processing system 502, 504 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device and the server may include respective sets of internal components 502a,b and external components 504a,b illustrated in FIG. 4. Each of the sets of internal components 502 include one or more processors 520, one or more computer-readable RAMs 522, and one or more computer-readable ROMs 524 on one or more buses 526, and one or more operating systems 528 and one or more computer-readable tangible storage devices 530. The one or more operating systems 528 is stored on one or more of the respective computer-readable tangible storage devices 530 for execution by one or more of the respective processors 520 via one or more of the respective RAMs 522 (which typically include cache memory). In the embodiment illustrated in FIG. 4, each of the computer-readable tangible storage devices 530 is a magnetic disk storage device of an internal hard drive. Alternatively, each of the computer-readable tangible storage devices 530 is a semiconductor storage device such as ROM 524, EPROM, flash memory or any other computer-readable tangible storage device that can store a computer program and digital information.

Each set of internal components 502a,b also includes a R/W drive or interface 532 to read from and write to one or more portable computer-readable tangible storage devices 538 such as a CD-ROM, DVD, memory stick, magnetic tape, magnetic disk, optical disk or semiconductor storage device. A software program, can be stored on one or more of the respective portable computer-readable tangible storage devices 538, read via the respective R/W drive or interface 532, and loaded into the respective hard drive 530.

Each set of internal components 502a,b also includes network adapters or interfaces 536 such as a TCP/IP adapter cards, wireless Wi-Fi interface cards, or 3G or 4G wireless interface cards or other wired or wireless communication links. A software program can be downloaded from an external computer via a network (for example, the Internet, a local area network or other, wide area network) and respective network adapters or interfaces 536. From the network adapters or interfaces 536, the software program is loaded into the respective hard drive 530. The network may comprise copper wires, optical fibers, wireless transmission, routers, firewalls, switches, gateway computers and/or edge servers.

Each of the sets of external components 504a,b can include a computer display monitor 544, a keyboard 542, and a computer mouse 534. External components 504a,b can also include touch screens, virtual keyboards, touch pads, pointing devices, and other human interface devices. Each of the sets of internal components 502a,b also includes device drivers 540 to interface to computer display monitor 544, keyboard 542, and computer mouse 534. The device drivers 540, R/W drive or interface 532, and network adapter or interface 536 comprise hardware and software (stored in storage device 530 and/or ROM 524).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
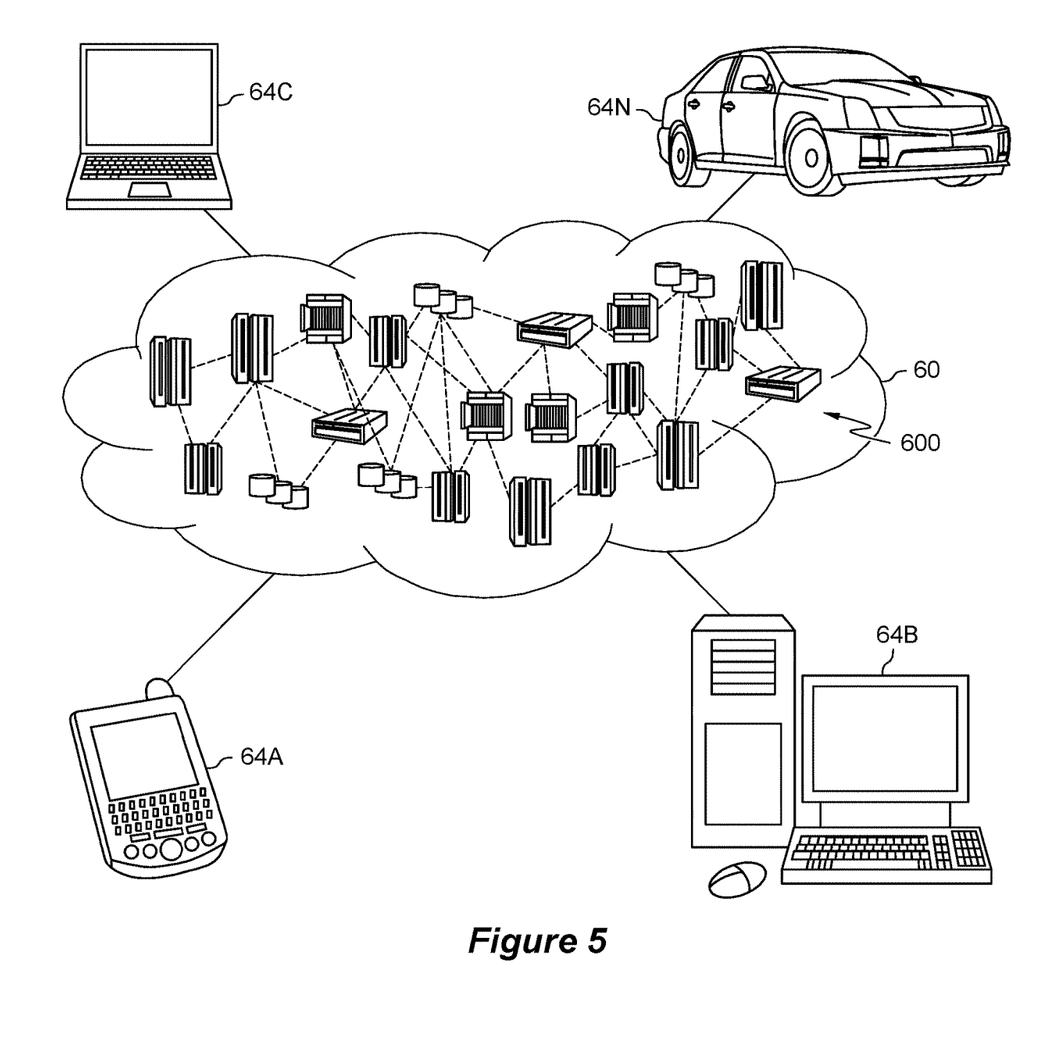
FIG. 5 depicts a cloud computing environment according to an embodiment of the present invention.

Referring now to FIG. 5, illustrative cloud computing environment 60 is depicted. As shown, cloud computing environment 60 comprises one or more cloud computing nodes 600 with which local computing devices used by cloud consumers, such as, for example, personal digital assistant (PDA) or cellular telephone 64A, desktop computer 64B, laptop computer 64C, and/or automobile computer system 64N may communicate. Nodes 600 may communicate with one another. They may be grouped (not shown) physically or virtually, in one or more networks, such as Private, Community, Public, or Hybrid clouds as described hereinabove, or a combination thereof. This allows cloud computing environment 60 to offer infrastructure, platforms and/or software as services for which a cloud consumer does not need to maintain resources on a local computing device. It is understood that the types of computing devices 64A-N shown in FIG. 5 are intended to be illustrative only and that computing nodes 600 and cloud computing environment 60 can communicate with any type of computerized device over any type of network and/or network addressable connection (e.g., using a web browser).

Figure 6:
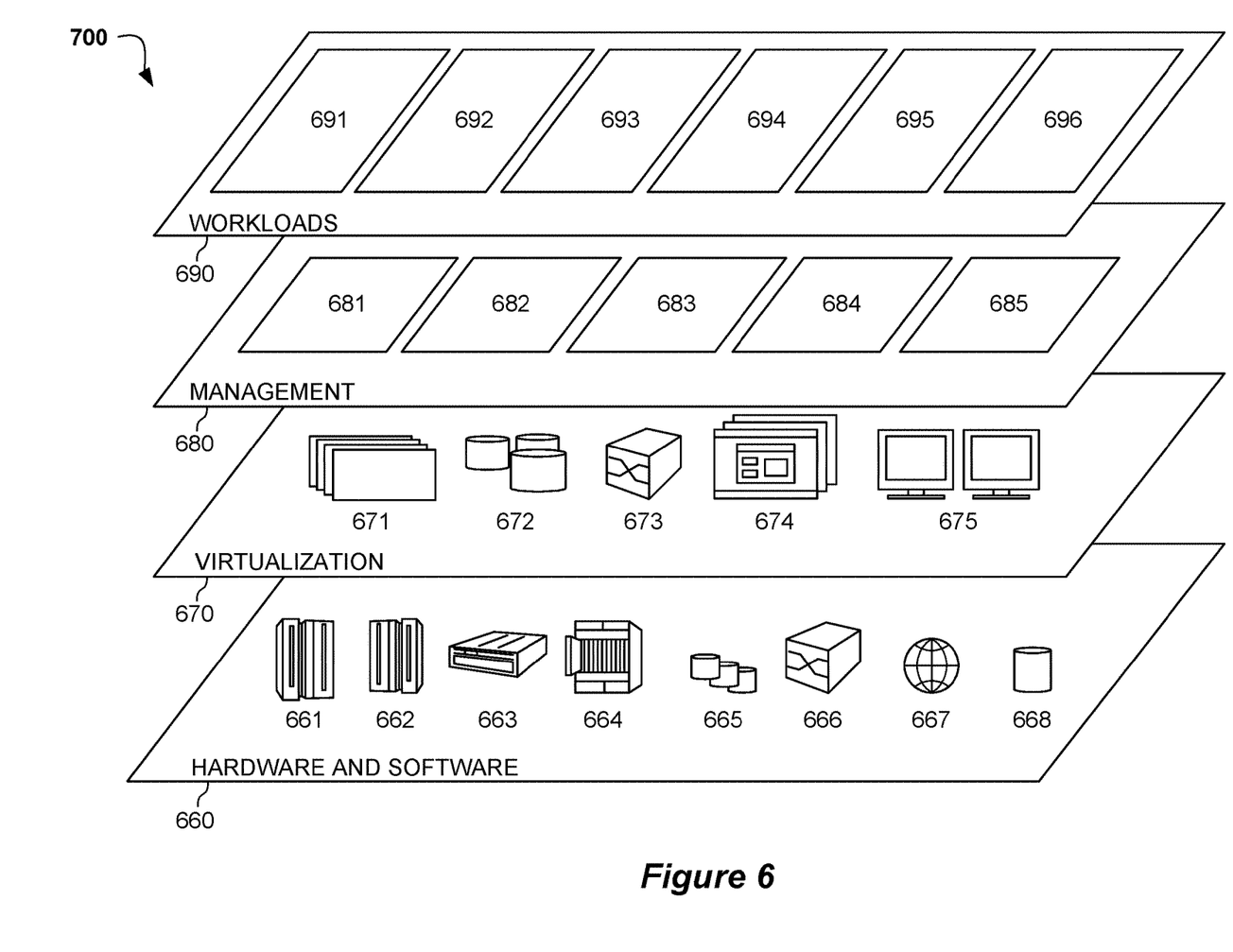
FIG. 6 depicts abstraction model layers according to an embodiment of the present invention.

Referring now to FIG. 6, a set of functional abstraction layers 700 provided by cloud computing environment 60 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672; virtual networks 673, including virtual private networks; virtual applications and operating systems 674; and virtual clients 675.

In one example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and disk selection 696. Disk selection 696 may relate to predictively selecting a subset of disks of a storage system to be spun-up.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

In summary, a system and a method for predictively selecting a subset of disks of a storage system to be spun-up have been presented. Said system/method is advantageous because the storage system performance in terms of access time is improved while still retaining the energy advantage of MAID systems.

What is claimed is:

1. A processor-implemented method for predictively selecting a subset of one or more disks of a set of disks of a storage system to be spun-up, the method comprising:
    providing metadata of a set of data entities stored in the set of disks of the storage system;
    estimating a set of access probabilities for a prediction time window corresponding to the set of data entities, wherein the prediction time window is based on the provided metadata and the prediction time window comprises a probability of access to the corresponding data entity of the set of data entities;
    calculating a set of disk access probabilities for the prediction time window corresponding to the set of disks, based on a subset of one or more access probabilities of the set of access probabilities which correspond to one or more of the subset of data entries on the corresponding disk of the set of disks;
    selecting the subset of one or more disks of the set of disks to be spun-up in the prediction time window, the selection based on:
        a subset of one or more access probabilities of the set of access probabilities, wherein the subset of the one or more access probabilities comprises a probability greater than a data entity access threshold value, a previous prediction time window false-negative data rate entity access,
        a subset of one or more disk access probabilities of the set of disk access probabilities, wherein the subset of the one or more disk access probabilities comprises a probability greater than a disk access threshold value, a previous prediction time window false-negative disk access;
    dynamically adapting the data entity threshold value and the disk access threshold value to meet a criterion of a maximum number of disks of the set of disks that are allowed to be spun-up at the same time and a target mean access latency of a file to be accessed in order to achieve a certain level of access latency to minimize a mean access latency dependent upon a comparison of an expected energy consumption and a target energy consumption in order to meet an energy consumption boundary; and
    selecting a second subset of one or more disks of the set of one or more disks to be spun-up in the following prediction time window based on the dynamically adapted disk access threshold value or the adapted data entity access threshold value,
    wherein the prediction time window is at least one day, wherein prediction accuracy improves with a longer prediction time window,
    wherein the subset of data entries of the subset of the one or more disks of the set of disks to be spun-up in the prediction time window which are predicted to be accessed are prefetched to a second storage medium, wherein the second storage medium comprises FLASH storage, wherein the selected subset of the one or more disks of the set of disks to be spun-up in the prediction time window are subsequently spun-down after the prefetch, wherein the access latency of the FLASH storage is less than access latency of the selected one or more disks of the set of disks to be spun-up in the prediction time window.

2. The method according to claim 1, wherein a number of disks in the subset of one or more disks of the set of disks to be spun-up in a certain prediction time window is based on a false-positive rate of disk access in a previous prediction time window.

3. The method according to claim 1, wherein a number of disks in the subset of one or more disks of the set of disks to be spun-up in a certain prediction time window is based on a false-positive rate of data entity access in a previous prediction time window.

4. The method according to claim 1, wherein a set of access probabilities is performed using a machine-learning algorithm based on metadata associated with the set of data entities.

5. The method according to claim 1, wherein the data entity access threshold value and/or the disk access threshold value builds an extended Neyman-Pearson threshold value.

6. The method according to claim 1, wherein the criterion further comprises a target power consumption and a target energy consumption.

7. The method according to claim 1, wherein the subset of one or more disks of the set of disks to be spun-down is determined based on metadata of one or more data entities of the set of data entities included in the corresponding disk, based on a corresponding disk access probability of the set of disk access probabilities and/or corresponding access probability of the set of access probabilities of data entities included in the respective disk.

8. The method according to claim 7, wherein a priority scheme is used for determining the subset of one or more disks of the set of disks to be spun-down.

9. The method according to claim 8, wherein the priority scheme defines multiple priority levels to be associated with a disk of the subset of one or more disks, wherein the selection of priority level for the disk of the subset of one or more disks depends on collected information regarding an access history of the disk of the subset of one or more disks.

10. The method according to claim 1, wherein the data entity threshold value and/or the disk access threshold value is iteratively adapted in successive prediction time windows.

11. The method according to claim 1, wherein an expected energy consumption of the storage system is calculated based on information regarding false-positive and/or false-negative rates of disk access and a peak power consumption value during a spin-up phase of the disks and a power consumption value of a spinning disk after expiry of a spin-up phase of a previous prediction time window.

12. The method according to claim 11, wherein the expected energy consumption is compared with a predefined power consumption value and the data entity threshold value and/or the disk access threshold value is adapted based on the comparison result.

13. The method according to claim 1, further comprising: dynamically adapting the data entity threshold value in order to change a number of disks in the subset of one or more disks of the set of disks to be spun-up in the following prediction time window.

14. The method according to claim 1, further comprising: dynamically adapting the disk access threshold value in order to change a number of disks in the subset of one or more disks of the set of disks to be spun-up in the following prediction time window.

15. The method according to claim 1, wherein an expected energy consumption of the storage system is calculated based on information regarding false-positive and/or false-negative rates of disk access of a previous prediction time window.

16. The method according to claim 15, wherein the expected energy consumption is calculated based on information regarding a peak power consumption value during a spin-up phase of the set of disks and a power consumption value of a spinning disk of the set of disks after expiry of the spin-up phase.

17. The method according to claim 15, wherein the expected energy consumption is compared with a pre-defined energy consumption value and the data entity threshold value is adapted based on the comparison result.

18. The method according to claim 17, wherein the data entity threshold value and/or the disk access threshold value is increased if the expected energy consumption is greater than the pre-defined energy consumption value and the data entity threshold value and/or the disk access threshold value is decreased if the expected energy consumption is smaller than the pre-defined energy consumption value.

19. The method according to claim 15, wherein the expected energy consumption is compared with a pre-defined energy consumption value and the disk access threshold value is adapted based on the comparison result.

\* \* \* \* \*